(12) United States Patent
Jackson

(10) Patent No.: US 7,584,720 B1
(45) Date of Patent: Sep. 8, 2009

(54) CANINE HABITAT

(76) Inventor: Thomas J. Jackson, 2201 Storm Rd., Stroudsburg, PA (US) 18360

( * ) Notice: Subject to any disclaimer, the term of this patent is extended or adjusted under 35 U.S.C. 154(b) by 483 days.

(21) Appl. No.: 11/648,147

(22) Filed: Dec. 29, 2006

Related U.S. Application Data

(60) Provisional application No. 60/755,468, filed on Dec. 30, 2005.

(51) Int. Cl.
*A01K 1/03* (2006.01)
*A01K 1/02* (2006.01)
*A01K 31/06* (2006.01)

(52) U.S. Cl. .................... 119/472; 119/452; 119/482

(58) Field of Classification Search .............. 119/452, 119/453, 454, 455, 456, 458, 472, 474, 475, 119/481, 480, 496, 498, 501, 482, 416, 417, 119/500, 484, 487, 489, 706, 490, 491, 493, 119/494, 165, 497; 206/503, 504, 509, 511; 220/4.26, 23.6
See application file for complete search history.

(56) References Cited

U.S. PATENT DOCUMENTS

| | | | | |
|---|---|---|---|---|
| 3,490,417 | A | * | 1/1970 | Swinney ............... 119/496 |
| 3,774,576 | A | | 11/1973 | Moore |
| 4,066,042 | A | * | 1/1978 | Bright ................ 119/453 |
| 4,342,393 | A | | 8/1982 | Box |
| D270,297 | S | | 8/1983 | Lovitt |
| 4,599,829 | A | * | 7/1986 | DiMartino, Sr. ......... 52/79.7 |
| D292,032 | S | | 9/1987 | Margolis |
| 4,723,512 | A | | 2/1988 | Margolis |
| 4,850,306 | A | | 7/1989 | Nitkin |
| 5,357,900 | A | * | 10/1994 | Ho ..................... 119/479 |
| 5,452,681 | A | | 9/1995 | Ho |
| D389,550 | S | | 1/1998 | Williams |
| 5,711,253 | A | | 1/1998 | Phillips et al. |
| 5,964,189 | A | * | 10/1999 | Northrop et al. ........ 119/482 |
| 6,209,490 | B1 | | 4/2001 | Schwede |
| 6,832,580 | B2 | | 12/2004 | Marchioro |
| 6,857,393 | B2 | | 2/2005 | Cheshire |
| 6,886,495 | B1 | | 5/2005 | Madden et al. |
| 7,032,540 | B2 | | 4/2006 | Bonner et al. |
| 7,059,274 | B2 | * | 6/2006 | Cheng ................. 119/455 |
| 7,114,463 | B2 | | 10/2006 | Donohoe |
| 7,487,744 | B1 | * | 2/2009 | Goldberg et al. ........ 119/453 |

* cited by examiner

*Primary Examiner*—T. Nguyen
(74) *Attorney, Agent, or Firm*—Botkin & Hall, LLP

(57) ABSTRACT

An animal habitat is disclosed for confining an animal in a livable area that may adapted to have distinct areas. The habitat may be formed of sections are used to form modules. The modules may be joined by attaching two or more modules laterally, or the modules may be joined by vertical stacking. Grates are placed in openings within outer walls of the modules. One type of grate allows attachment of monitoring and feeding equipment, while others are utilized as doors. Animals contained in a module can pass into laterally attached modules. A staircase and an opening in an upper section of a module allows animals to travel between a lower module to an upper module. Other accessories such as a tray and monitoring devices may be included as desired in one or more module.

14 Claims, 17 Drawing Sheets

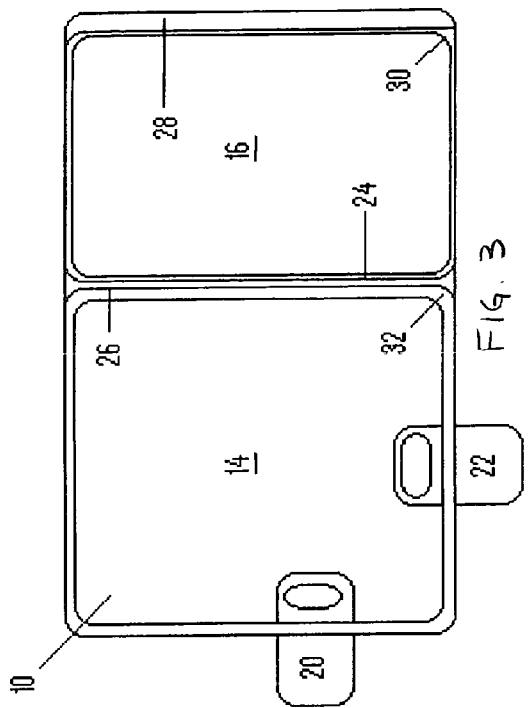
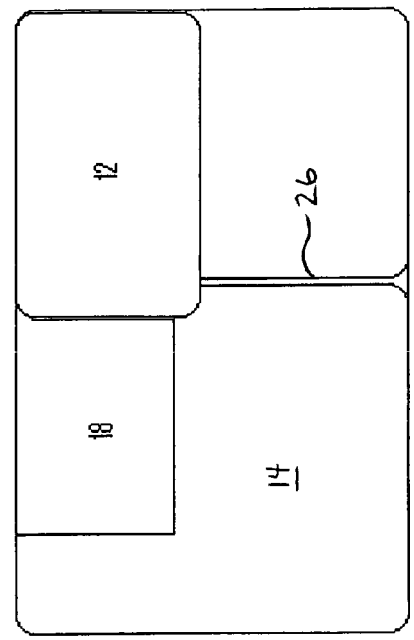
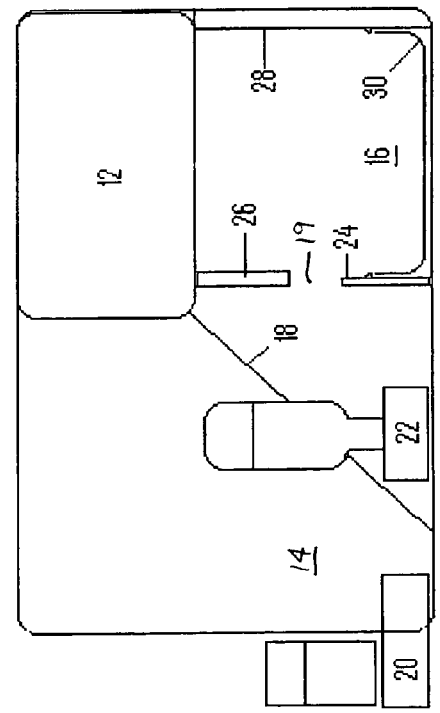

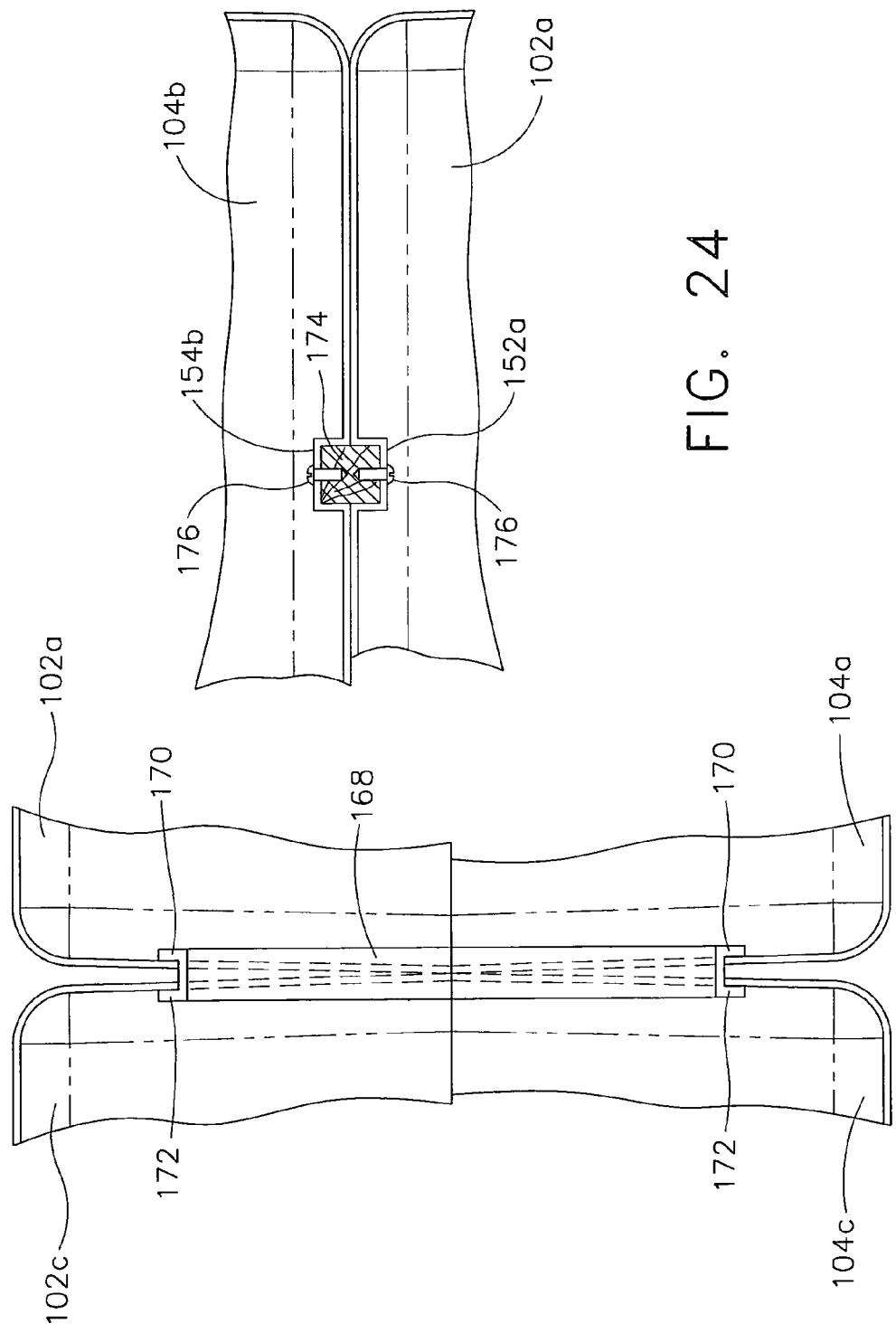

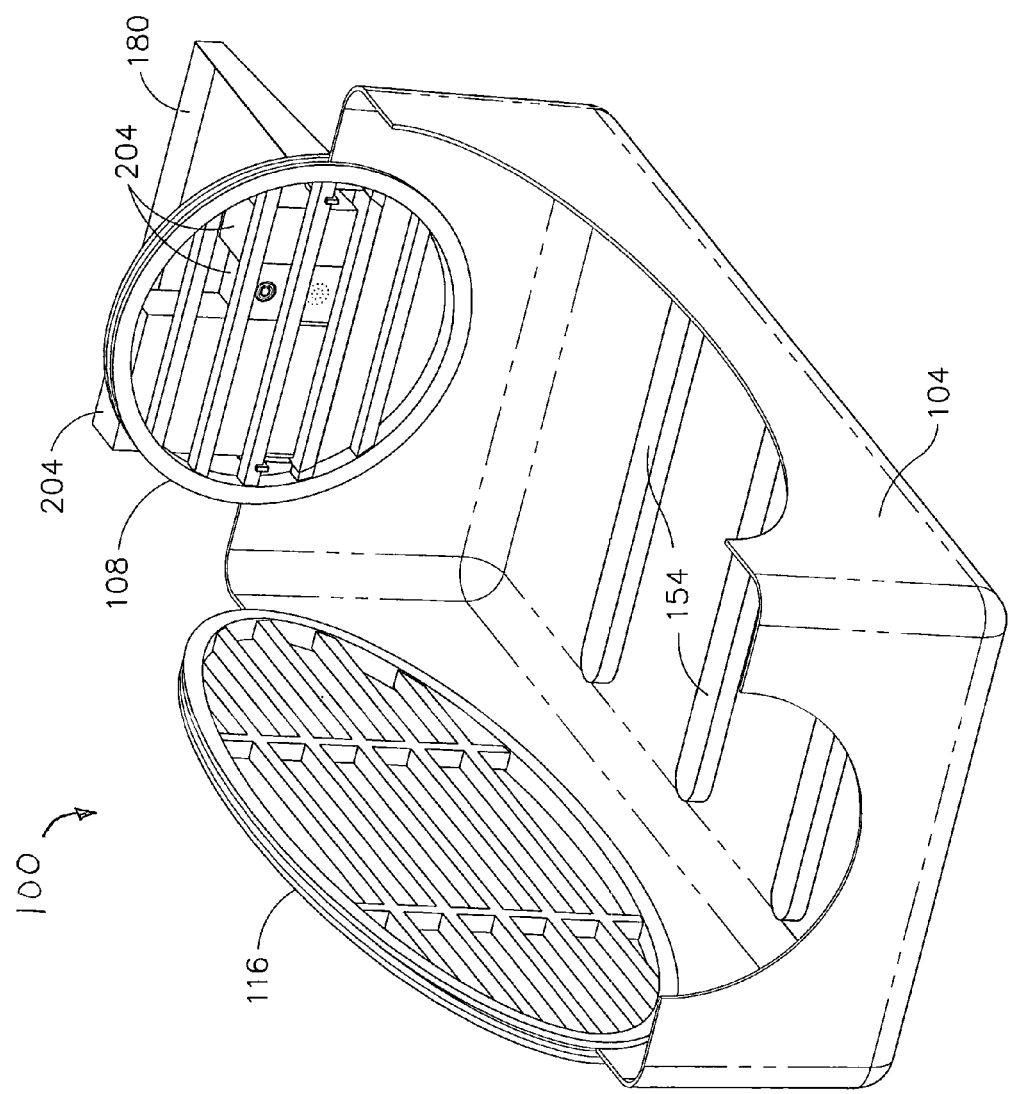

CANINE HABITAT

CROSS REFERENCE TO RELATED APPLICATIONS

This application claims the benefit of U.S. provisional application Ser. No. 60/755,468, filed Dec. 30, 2005 the disclosure of which is hereby incorporated by reference.

BACKGROUND OF THE INVENTION

Modern domesticated animals have descended from wild animals and have inherited certain basic instincts, including feeling comfortable and protected in small confined areas during rest. A travel kennel or crate is a small confined area like a den, yet an animal can be trapped in a small kennel or crate with little opportunity to exercise or move around. Domesticated animals have also inherited an instinct not to soil the areas they use for food and water. Many domesticated animals are pack animals and consider their master and family an adopted pack. Many domesticated animals experience varying degrees of separation anxiety when separated from their adopted pack; this anxiety sometimes results in destructive behavior such as chewing and house soiling. For the above reasons, among others, it is recommended to crate domesticated animals when they are left at an owner's home alone. However, due to the confined nature of current kennels and crates, many owners are hesitant to crate their animals.

SUMMARY OF THE INVENTION

The present invention provides a canine habitat.

The present invention presents a canine habitat having a structure with three main areas: an eating/living/playing area, a sleeping area, and an elimination area. The areas are situated in a stacked arrangement so that the sleeping area sits above the elimination area and is accessible by way of a vertically rising pathway. The elimination area may be partially cordoned off and may include a removable tray for ease of cleaning. The eating/living/playing area has the widest expanse and includes components for supplying food and/or drink to an animal.

The present invention may further be embodied using two sections joined to form a module. The sections are preferably made of a plastic polymer material and identical in shape and size, allowing one mold to be used to make both sections. Fasteners and banding may be used to join and retain the sections in engagement to form a complete module.

Each section may have openings in its walls which, when joined to another section to form a module, create openings in the module. Grates may be inserted in these module openings and are retained by engagement flanges on the circumferential perimeter of the grates. The grates are retained and captured when the sections are joined. One type of grate has fixed bars which are spaced at a certain distance to allow the passage of air and light and for the retention of feeding and monitoring devices between the bars of the grate. Another type of grate that may be used has bars which are slidingly engaged in tubes. This configuration allows the bars to be retracted inside the tubes to form a door for an animal. Still another type of grate has a removable section having end pieces which are slotted to engage pins attached to the remaining grate structure so the removable section may be lifted upward and outwardly removed.

Modules may be joined laterally to other modules using module connectors inserted into the openings of two adjacent modules. The module connectors join two modules and allow an animal to pass between the two modules. Similar to the grates, the module connectors are captured within an opening of a module when the sections are joined. The module connector is an enclosed shape that has engagement flanges on its circumferential perimeter which engage the walls of two adjacent modules.

Modules may also be joined and stacked vertically. Each section has a plurality of indentations on a surface which face inward toward a cavity of each section. When the sections are joined to form a module, the indentations of a lower section complement the indentations of an upper section, with the plurality of indentations of the lower and upper sections facing inward toward the module cavity. When a second module is placed on top of a first module, indentations on a lower surface of the second module oppose the indentations on an upper surface of the first module to form smaller cavities. The smaller cavities formed between the indentations may accept a beam or similar structural member or members, which add rigidity to the connection between the two modules. The beams may be fastened to both the lower surface of the second module and the upper surface of the first module at the indentations to secure modules together.

Within modules, additional accessories may be included such as a pathway or staircase to reach upper modules and trays for food, water, elimination of waste, bedding, or a variety of other uses. The pathway or staircase may allow an animal to access a second or successive module stacked upon a first or successive module. The staircase contains a set of steps with a certain vertical spacing, and within the staircase there may also be a second set of smaller steps with vertical spacing equal to but vertically translated between the larger set of steps. This second set of steps allows smaller animals to use the smaller set of steps within the staircase to travel more easily to a vertically stacked and joined second or successive module. Since modern animals instinctively will not soil their living areas, a tray for elimination of waste may be placed in one module, therefore containing any waste to a specific area. Additional trays may also be placed in the same or other modules. The trays are removable which allow for easy clean up for an owner.

An object of the invention is to provide a canine habitat made of three sections or areas, two of which are joined on one level and one of which is joined to at least one of the others above the others.

Another object of the invention is to provide an animal habitat with modular construction which may be combined and joined as a customer desires.

Another object of the invention is to provide a customizable animal habitat through the use of interchangeable parts.

Other objects of the invention will become apparent upon reading of the following description.

BRIEF DESCRIPTION OF THE DRAWINGS

FIG. 1 is a side sectional view of an embodiment of a canine habitat module according to the present invention;

FIG. 2 is a partial top view of the embodiment of FIG. 1;

FIG. 3 is a top sectional view of the lower level of the embodiment of FIG. 1;

FIG. 23 is a fragmentary view of the module connector of FIG. 19, shown in use to connect two habitat modules;

FIG. 24 is a sectional view of indentations on opposing surfaces of two habitat modules, shown fastened together;

FIG. 28 is an alternate perspective view of a bottom section of a habitat module shown with the shelf of FIG. 21 and various equipment.

DETAILED DESCRIPTION OF INVENTION

Figure 4:
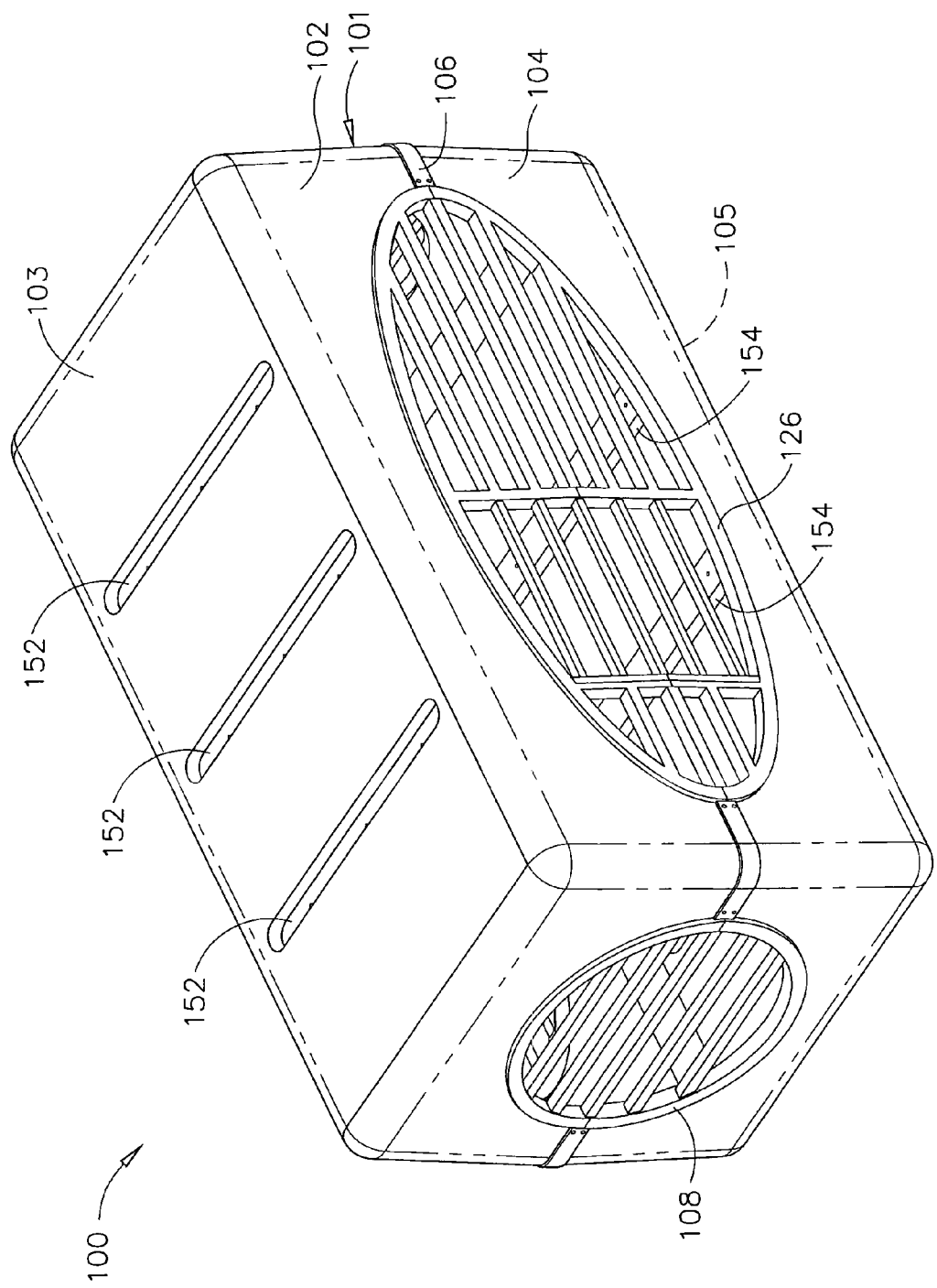
FIG. 4 is a perspective view of another embodiment of the habitat module according to the present invention.

A canine habitat 10 is shown in one embodiment in FIG. 1. The habitat 10 has a structure preferably made of a rigid composite material and has three distinct areas: an area 14 for eating/living/playing, an area 16 for elimination of waste, and an area 12 for relaxation and sleep. In the eating/living/playing area 14, devices for feeding 20 and watering 22 may be included which fit through the walls 32 of the structure of the habitat 10 and may be remotely controlled. A raised pathway 18 leads from the eating/living/playing area 14 to the relaxation and sleep area 12 so the dog can travel between area 14 and area 12. A pathway 19 leads between area 14 and area 16. The relaxation and sleep area 12 is supported above the area for elimination of waste 16 through a rigid front support member 26 and a rigid back support member 28, as shown in FIG. 2. A separate divider 24 runs parallel to the rigid front support member 26 and aids in separation of the area for elimination of waste 16 from the eating/living/playing area 14. As seen in FIG. 3, a removable tray 30 may be placed in the area for elimination of waste 16 to allow for ease of removal of waste.

A dog is placed in the habitat 10 and is able to freely traverse from the eating/living/playing area 14 to the area 16 for elimination of waste to the area 12 for relaxation and sleep. The devices for feeding 20 and watering 22 enable the dog to stay within the confines of the habitat 10 for an extended period of time.

Figure 5:
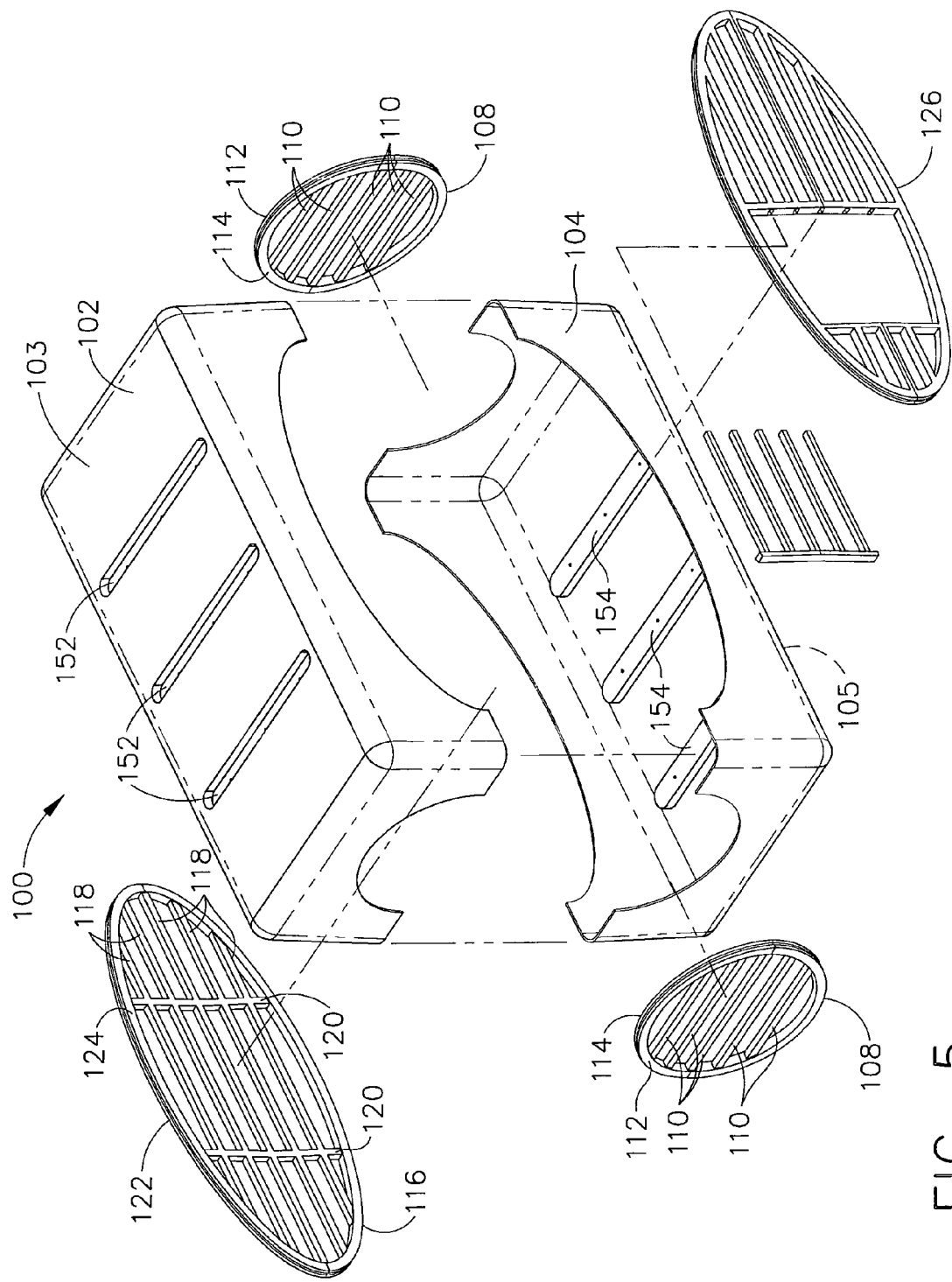
FIG. 5 is an exploded view of the habitat module of FIG. 4.
Figure 6:
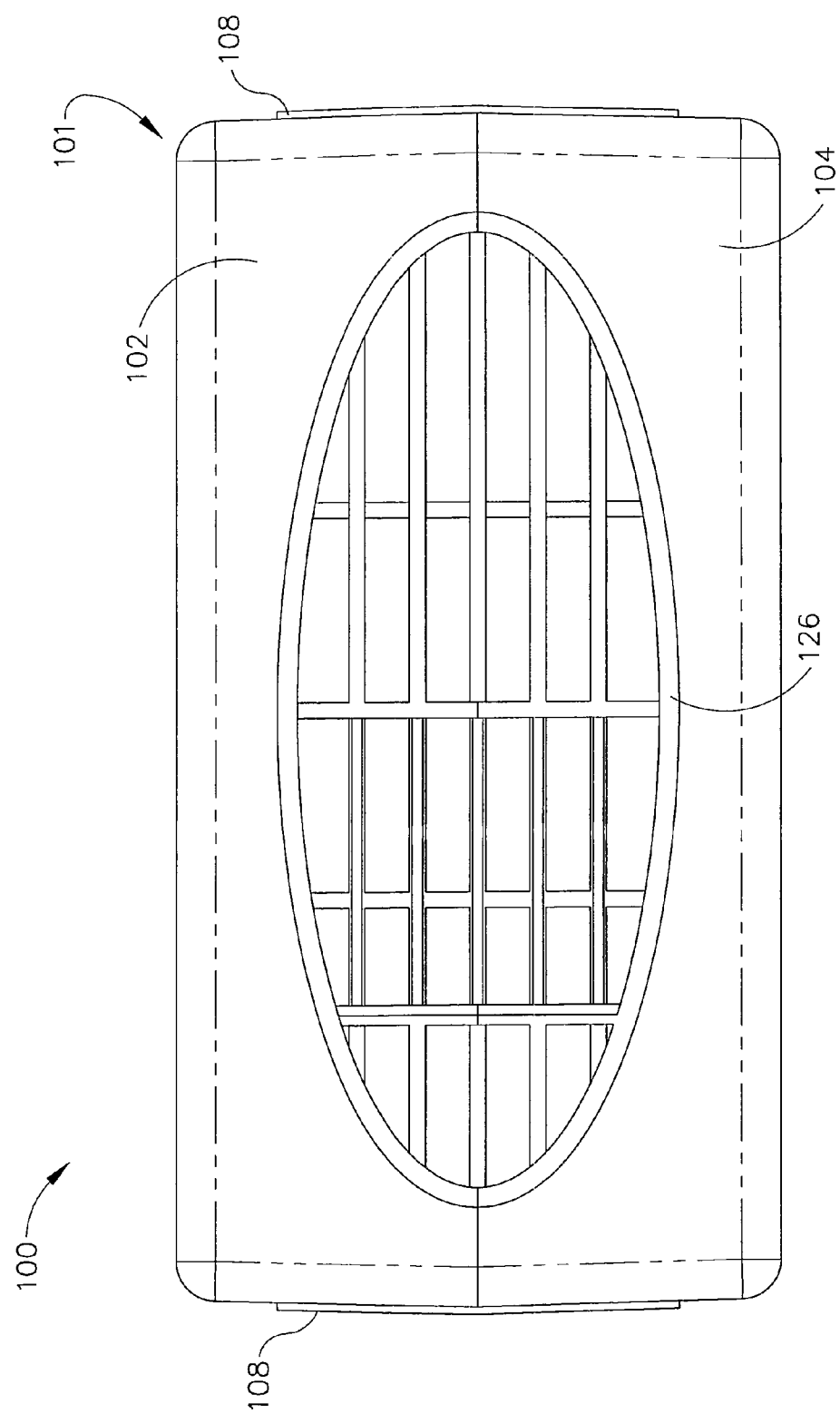
FIG. 6 is a front elevational view of the habitat module of FIG. 4.
Figure 7:
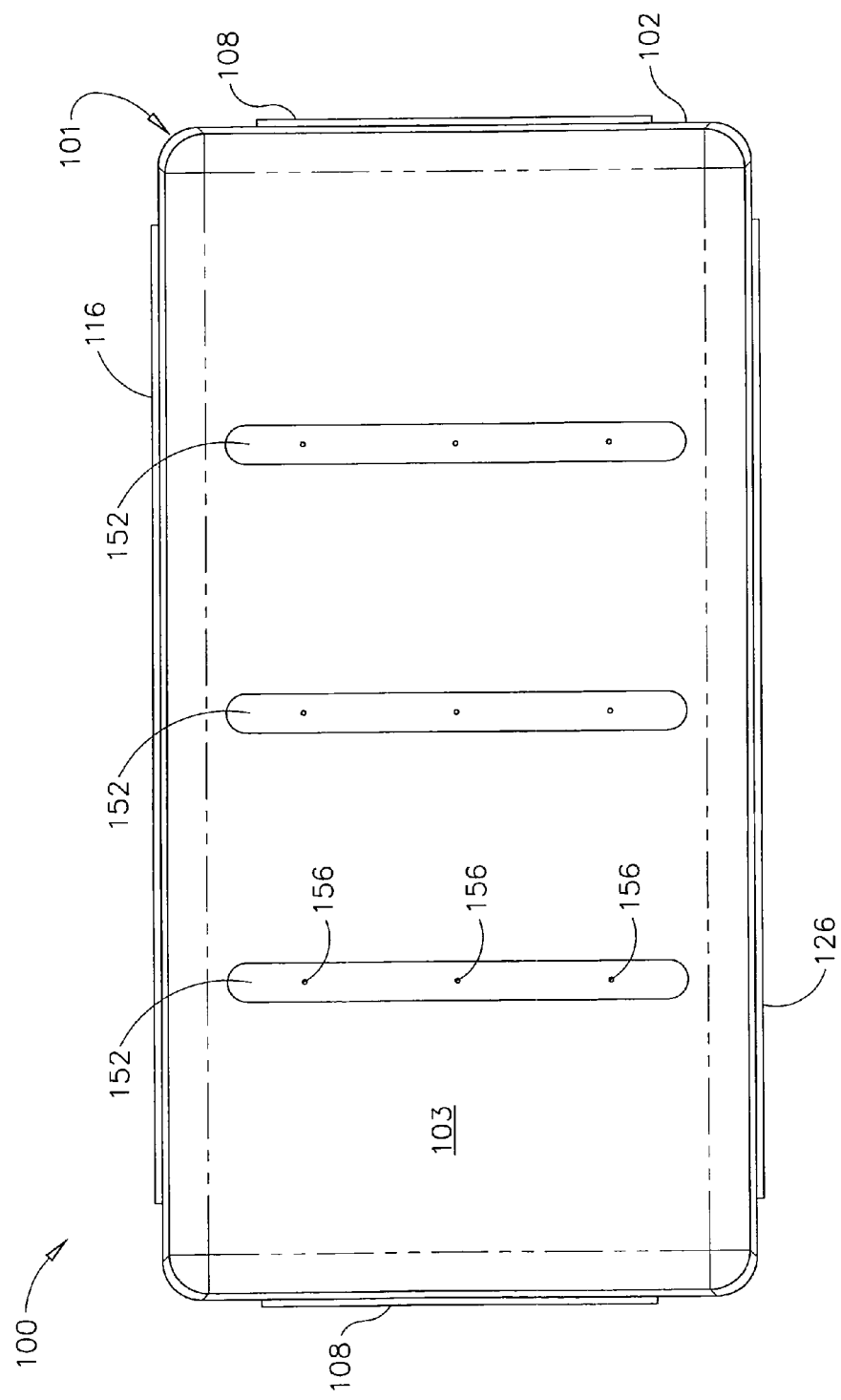
FIG. 7 is a top plan view of the habitat module of FIG. 4.
Figure 8:
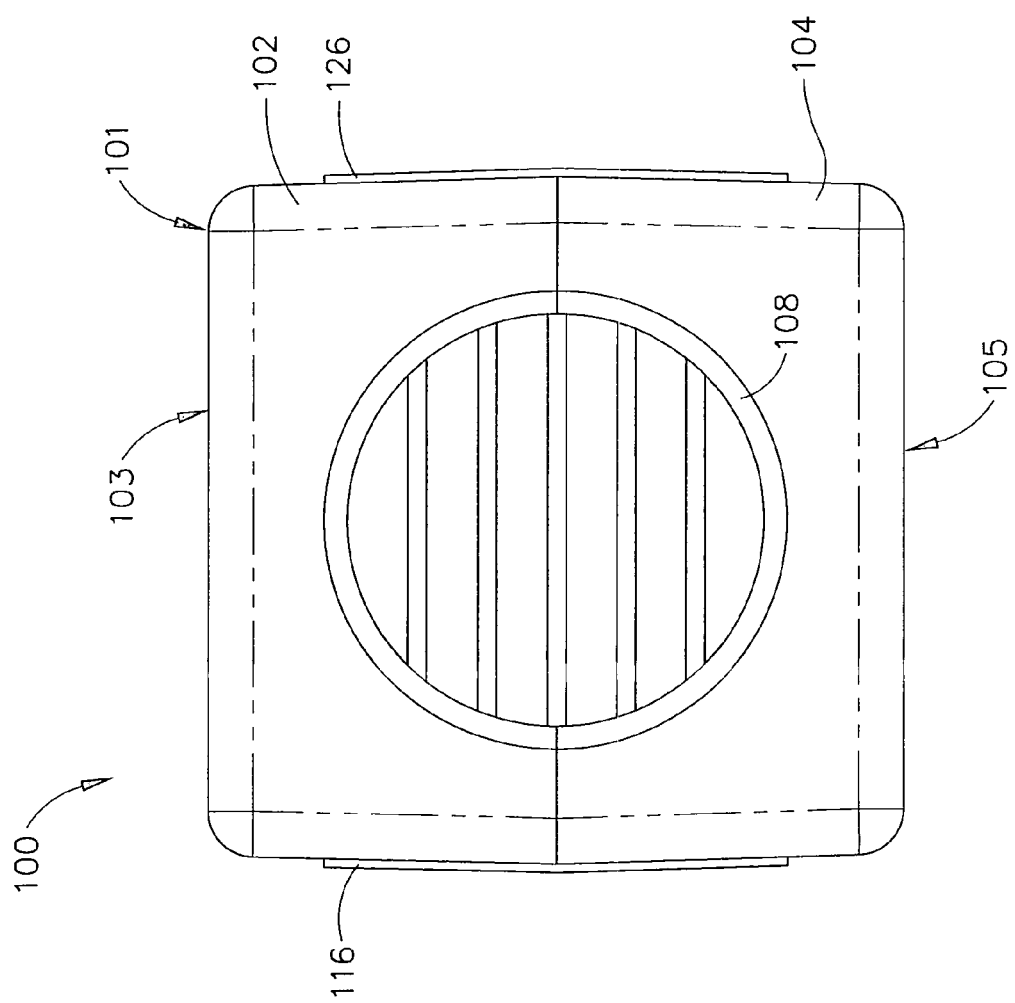
FIG. 8 is an end elevational view of the habitat module of FIG. 4.
Figure 9:
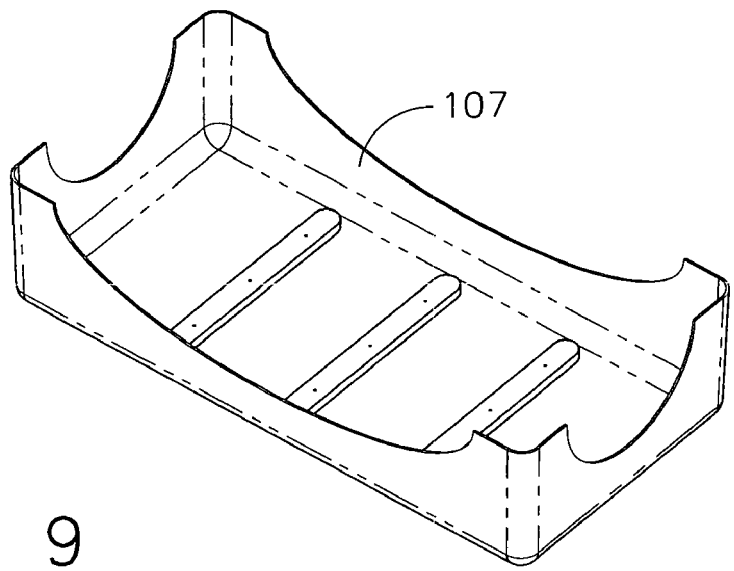
FIG. 9 is a perspective view of one section of the habitat module of FIG. 4, shown with openings in all four sides.
Figure 10:
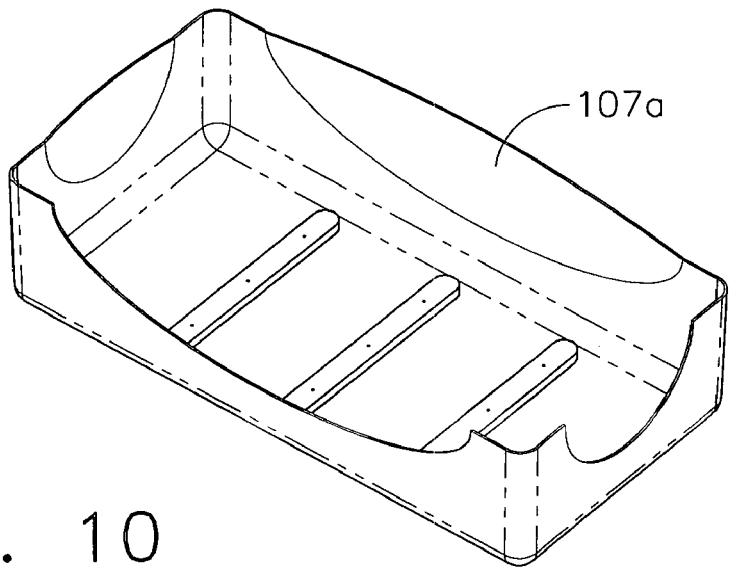
FIG. 10 is a perspective view of one section of a habitat module, shown with openings in two sides.
Figure 11:
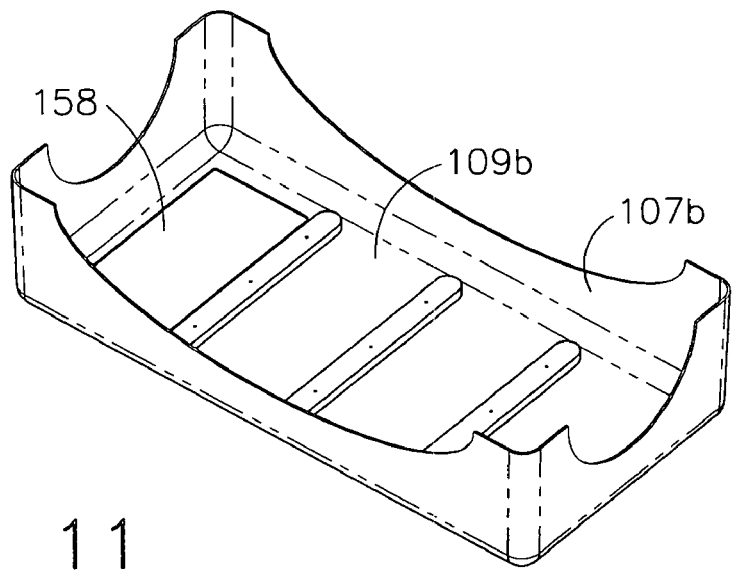
FIG. 11 is a perspective view of one section of a habitat module, shown with openings in four sides and an opening in the floor.
Figure 12:
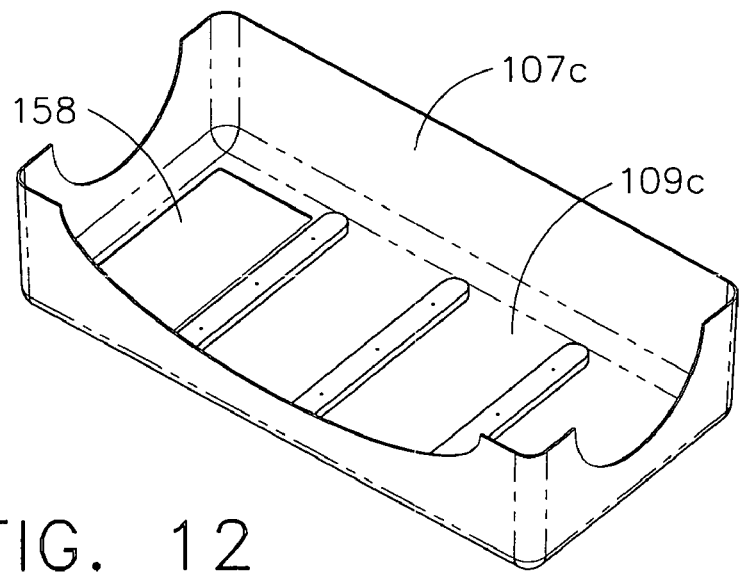
FIG. 12 is a perspective view of one section of a habitat module, shown with openings in three sides and an opening in the floor.
Figure 13:
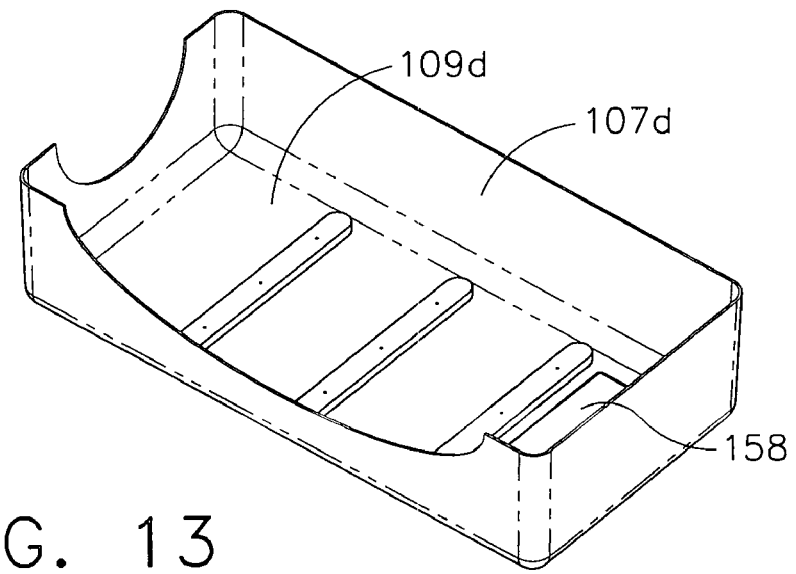
FIG. 13 is a perspective view of one section of a habitat module, shown with openings in two sides and an opening in the floor.
Figure 14:
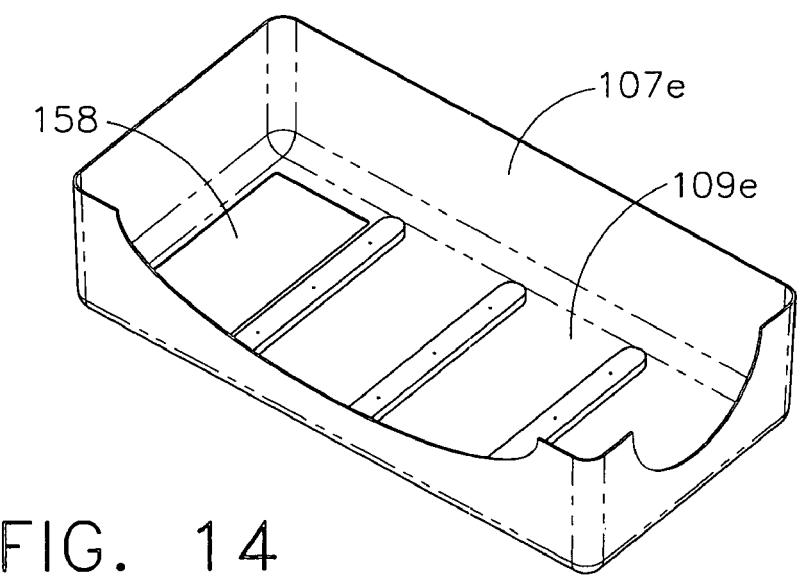
FIG. 14 is a perspective view of one section of a habitat module, shown with openings in two sides and an opening in the floor.
Figure 18:
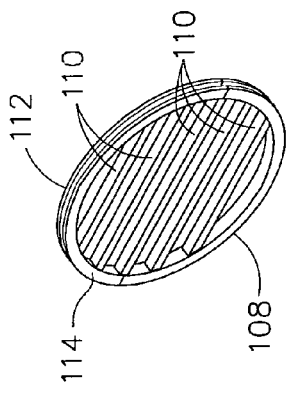
FIG. 18 is a perspective view of a circular grate used with the habitat module of FIG. 1.
Figure 19:
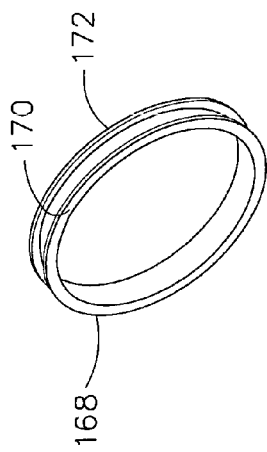
FIG. 19 is a perspective view of a circular module connector used with the habitat of FIG. 12.
Figure 16:
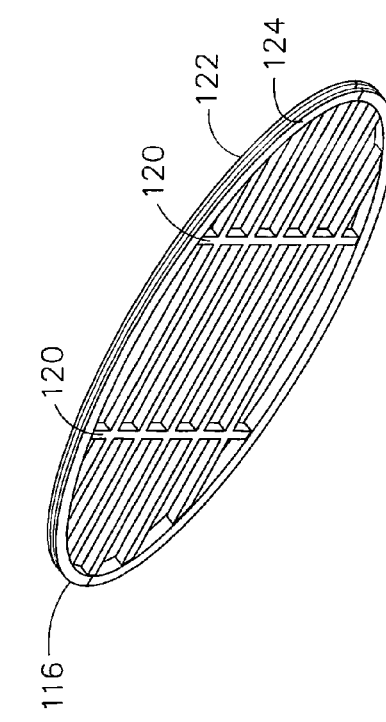
FIG. 16 is a perspective view of an elongated grate used with the habitat module of FIG. 1.

FIG. 4 shows a view of another embodiment 100 of the habitat. An upper module section 102 is joined to a lower module section 104, which may be used interchangeably to form a module 101. Banding 106 may be used to traverse a portion of and join both sections 102, 104. Side grates 108 are engaged between openings in the sections 102, 104. The grates 108 are preferably made of metal and include a plurality of horizontal tube members 110. As shown in FIG. 5, annular flanges 112, 114 fit around a portion of a side wall of each of module sections 102, 104 defining an opening into the module. The side grates 108 are further shown in FIG. 18. A rear grate 116 is shown engaged between further openings in sections 102, 104. The rear grate 116 is preferably made of metal and includes a plurality of horizontal tube members 118 and vertical tube members 120. The rear grate 116 is further shown in FIG. 16. Annular flanges 122, 124 fit around a portion of a rear wall of each of the module sections 102, 104 defining an opening into the module.

Figure 25:
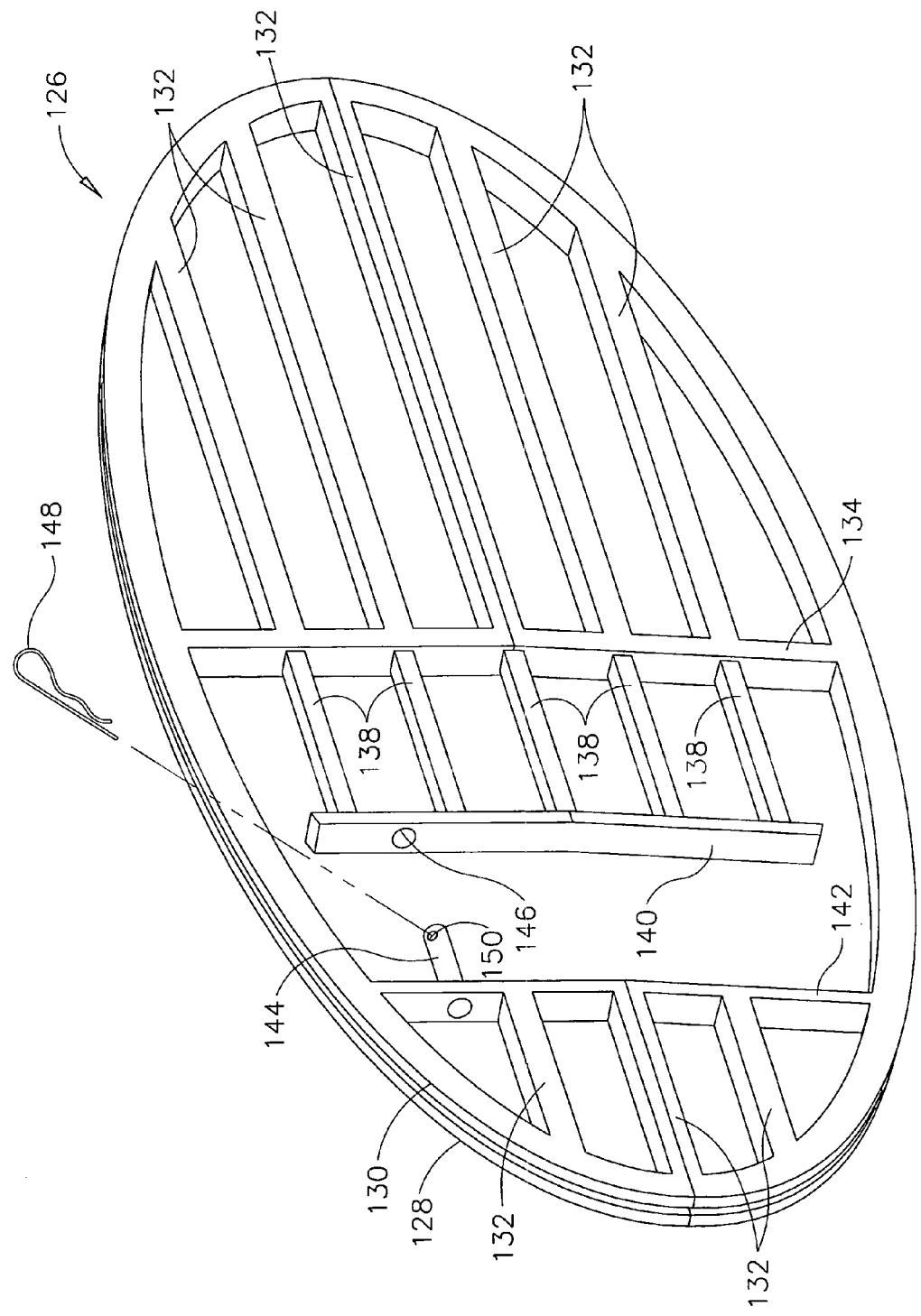
FIG. 25 is a perspective view of one embodiment of a grate door.

A door grate 126 is positioned and engaged between openings in the module sections 102,104 on a front wall. The door grate 126 is further shown in FIG. 25. Annular engagement flanges 128, 130 fit around and engage a portion of the front wall of each of the module sections 102, 104 at an opening therein. The door grate 126 is preferably elongated, made of metal, and includes a plurality of horizontal tube members 132 and at least one vertical tube member 134. The door grate 126 further includes a sliding door 136 having horizontal tube members 138 that fit slidingly within the horizontal tube members 132 of the door grate 126. A vertical end 140 connects the horizontal tube members 136. The door grate 126 may be equipped with a locking pin 144 extending laterally from a vertical door support 142. The locking pin 144 fits within an opening 146 in the vertical end 140 when the door 136 is closed and is locked by a pin 148 or similar device through a hole 150 in the locking pin 144. Alternately, the door grate 126 may be locked through attaching a wire, nut and bolt combination, or other similar locking device through hole 150. If desired, door 136 could be hinged so as to swing between open and closed positions.

As shown in FIGS. 4-8, the embodiment 100 includes a habitat module 101. The upper module section 102 includes a plurality of indentations 152 on a planar face 103; the lower module section 104 includes a plurality of indentations 154 on a planar face 105. Indentations 152, 154 may include pre-drilled holes 156.

As shown in FIGS. 9-14, the module sections 107, 107a, 107b, 107c, 107d and 107e may be used as either upper or lower module sections in place of the upper module sections, 102, 104 to vary the openings in the habitat module 101. Shown in FIGS. 11-14, an opening 158 in surfaces 109b, 109c, 109d, and 109e is shown to be utilized if one module is used in a vertically stacked relationship with another module to allow for passage between two modules, as an opening 158 on any of modules sections 107b-e, used as a lower module section of an upper module, are aligned so as to complement an opening 158 on identical module sections 107b-3, used as a upper module section of a lower module.

Figure 15:
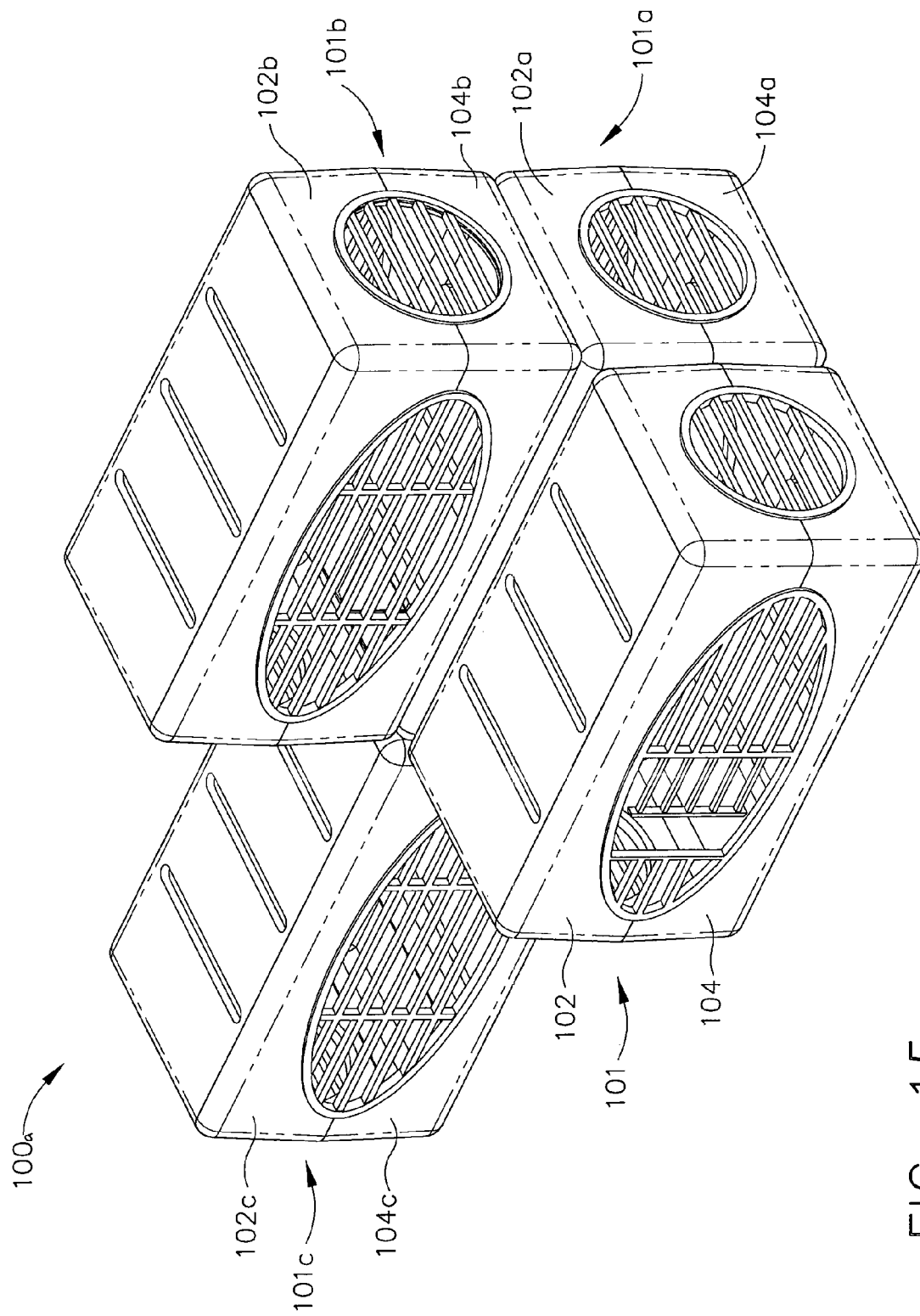
FIG. 15 is a perspective view of a habitat having a plurality of habitat modules connected both vertically and laterally.
Figure 17:
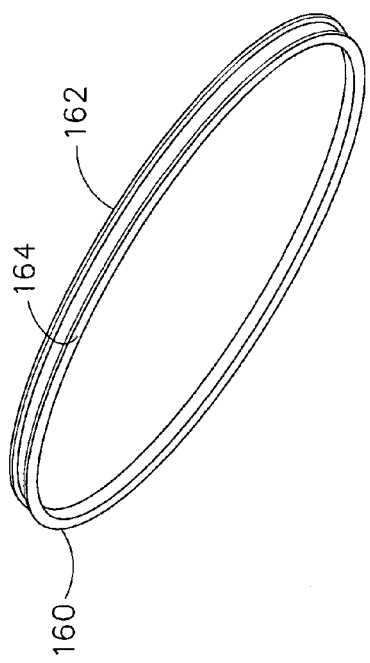
FIG. 17 is a perspective view of an elongated module connector used with the habitat of FIG. 12.
Figure 20:
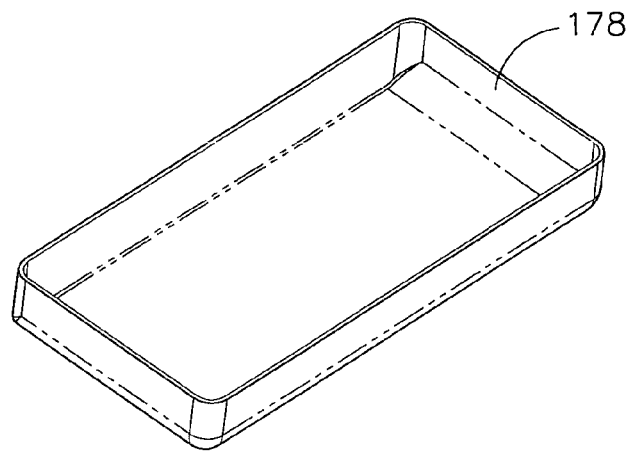
FIG. 20 is a perspective view of a tray for food, water, waste or bedding.

FIG. 15 illustrates another embodiment 100a of the habitat in modular form with four modules, 101 (like area 14), 101a (like area 16), 101b (like area 12), and 101c. Modules 101 and 101a-c are joined through modular connectors 160 and 168, further shown in FIGS. 17 and 18, respectively. For rear lateral connection, as shown between modules 101 and 101a, module connector 160 is used which, like the rear grate 116, includes engagement flanges 162, 164 to fit over a portion of and engage a rear wall portion of each module sections 102, 104. The module connector 160 also fits over and engages a front wall portion of each of the module sections 102a, 104a of module 101a. Modules 101a and 101c are joined through modular connector 168 for a side lateral connection. The modular connector 168 includes engagement flanges 170 and 172 to fit over and engage a portion of a side wall of each of module sections 102a, 104a and to fit over and engage a portion of a side wall of each of module sections 102c, 104c. Such a connection is shown in further detail in FIG. 24.

The vertical connection between modules 101a and 101b in FIG. 15 is accomplished through the alignment of the plurality of indentations 154b on the module section 104b and the plurality of indentations 152a on the module section 102a, as shown in further detail in FIG. 24. Lateral support braces 174, which may be made of wood, metal, or other material, are placed in indentations 152a. To join module 101a to module 101b, the module section 104b is placed over module section 102a, aligning the plurality indentations 154b and 152a. Fasteners 176 are then used to attach module section 102a and 104b to the lateral support braces 174, thus joining the modules 101a and 101b.

Figure 22:
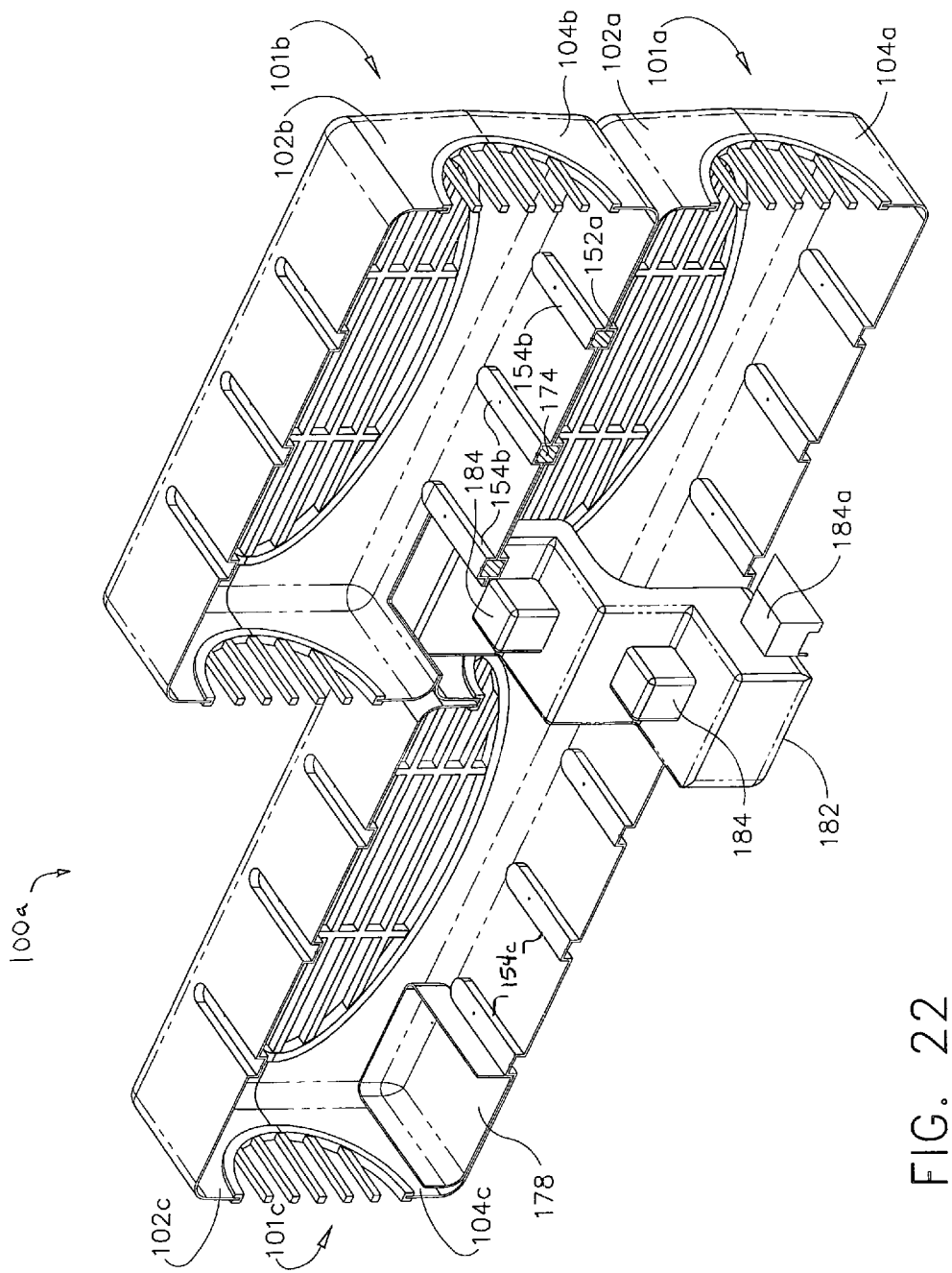
FIG. 22 is a fragmentary view of the habitat of FIG. 15.

A tray 178 is included which removably fits preferably between an outer wall of a lower module section and an adjacent indentation 154 and is transferable to any module within the embodiment 100a. The tray, though not shown, can be used in the one module animal habitat of FIGS. 4-8, as well. As shown in FIG. 22, the tray 178 is used in module 101c and is fitted between an outer wall of the lower module section 104c and an indentation 154c. Such a tray 178 is preferably used to collect the elimination of animal waste and an animal using the embodiment 100a can be trained to utilize the tray 178 for such purposes. Additional trays 178 may be placed around to be used for food, water, toys, or other purposes.

When two modules are stacked and joined vertically, as modules 101a and 101b, shown in FIG. 22, one or more of module sections 107b-e, which include an opening 158 in a planar face of the module section is used to provide a vertical path from a lower module to an upper module. A physical pathway is used to allow an animal to reach an upper module from a lower module and is preferably in the form of a staircase 182. The staircase 182 has an equal vertical spacing between steps and is fitted within the lower module 101a in FIG. 22 and provides a pathway for an animal to reach the upper module 101b. Preferably, a second staircase 184 with smaller steps is included within the staircase 182 and includes an equal vertical spacing between its steps that is the same as the steps of the staircase 182. The staircase 184 is vertically translated so as to effectuate a complementary vertical spacing between the steps of the staircase 182 and the steps of the staircase 184. The staircase 184 also preferably has a bottom-most step 184a which fits over and engages an indentation 154a to further secure the combined staircase 182, 184 to the lower module 101a.

Figure 21:
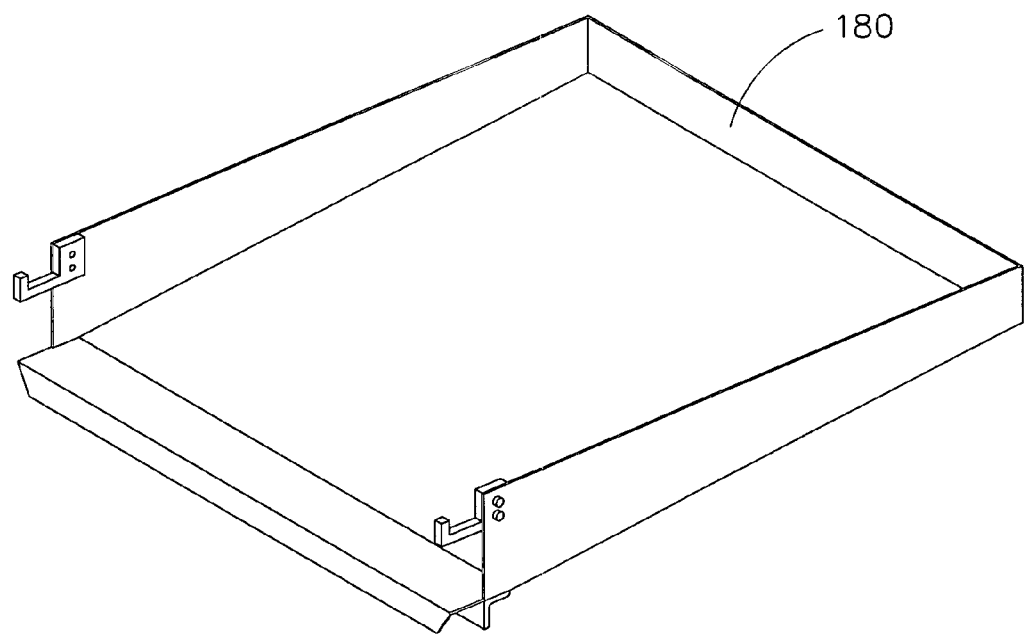
FIG. 21 is a perspective view of a shelf for equipment.
Figure 27:
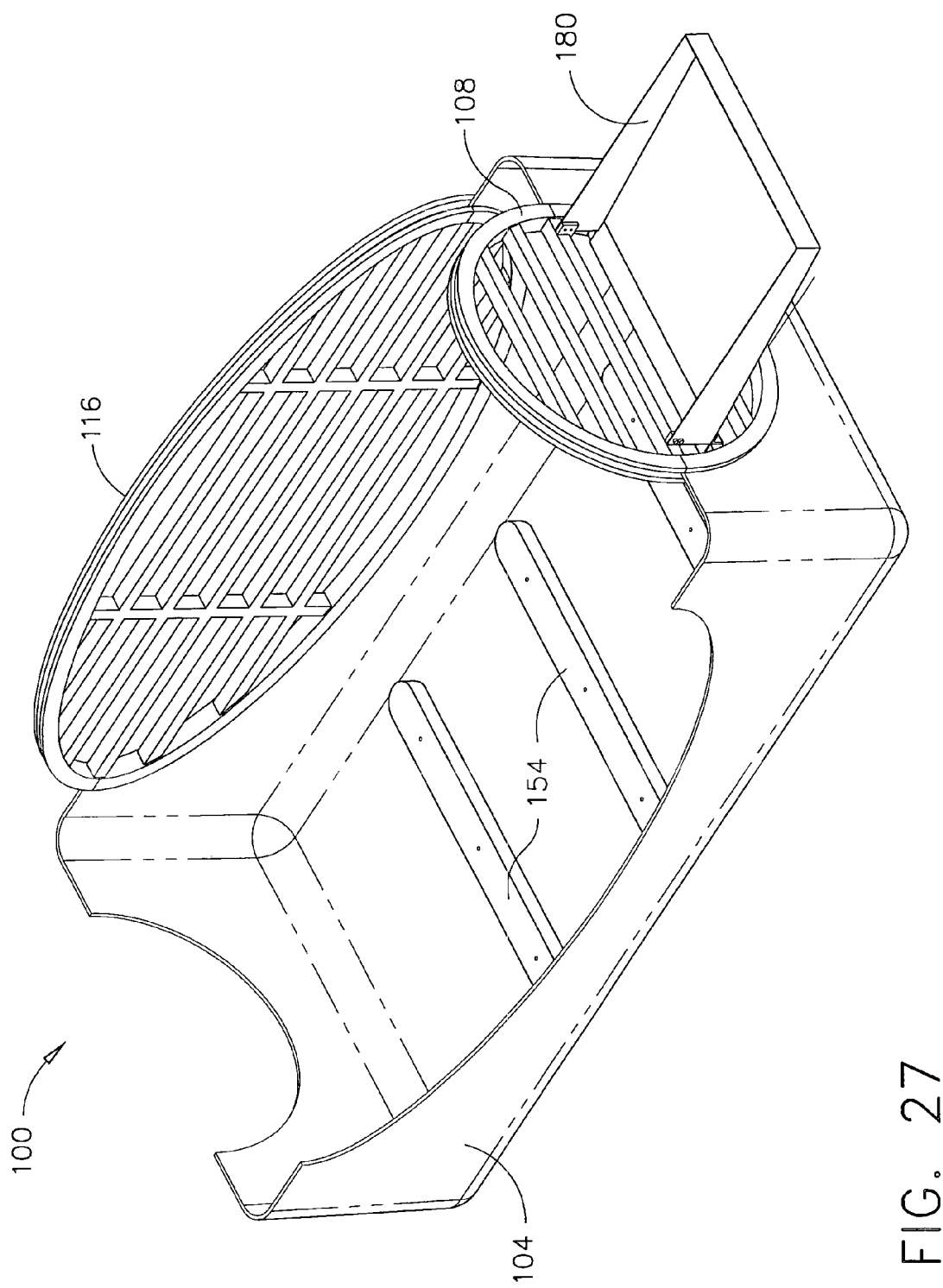
FIG. 27 is a perspective view of a bottom section of a habitat module shown with the shelf of FIG. 21.

As shown in FIG. 21, a shelf 180 is included for holding various equipment used preferably to monitor, feed and interact with an animal in the animal habitat 100a. The shelf 180 may be removably attached to a side grate 108, as shown in FIGS. 27 and 28, or to a rear grate 116 or door grates 126, 186. Various equipment 204 may be placed on the shelf 180; such equipment 204 includes, but is not limited to, video cameras, dispensers of food or liquid, dispensers of toys, microphones, speakers, and lights. The equipment 204 may be directly controlled from the shelf 180 by an individual or computer or may also be remotely controlled through wired or wireless devices such as a computer over the internet.

Figure 26:
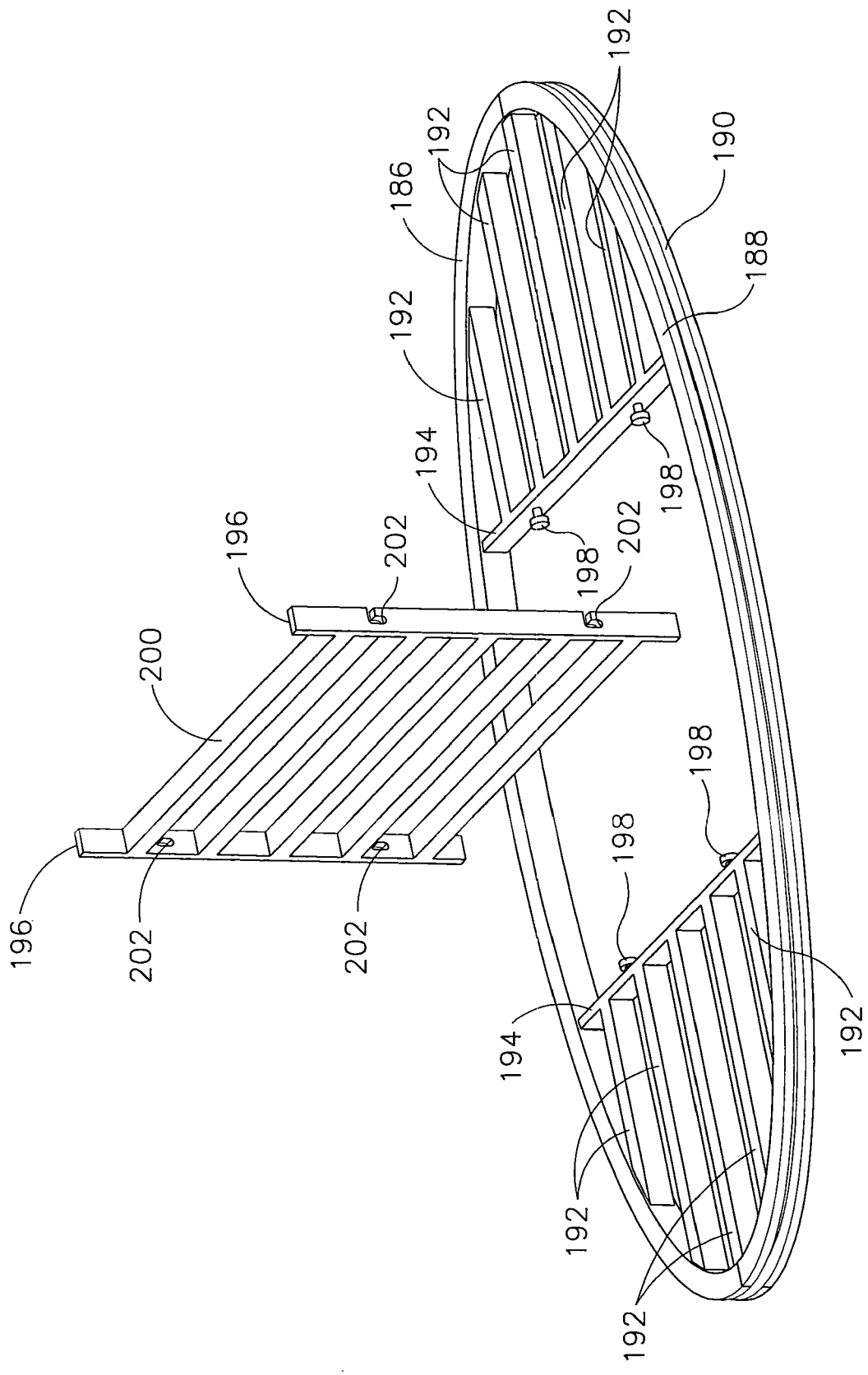
FIG. 26 is a perspective view of another embodiment of a grate door.

A second embodiment of a door grate 186 is shown in FIG. 26 which has engagement flanges 188, 190 and a plurality of horizontal tube members 192 and vertical door supports 194. Located on the vertical door supports 194 are a plurality of pins 198 which engage a removable section 200 at slots 202 in vertical ends 196. To provide an opening for an animal to enter into or exit the habitat 100, the removable section 200 is lifted upwardly and outwardly from a module to disengage the removable section 200 from the pins 198.

In operation, the embodiment 100, as shown in FIGS. 4-8, may have one module including a door grate 126 or 186 as the only opening to enter into and exit the module. Additional varieties of accessories such as additional openings and grates 108, 116, shelves 180, equipment 204 and trays 178 may be added to the one-module habitat 100. To expand the animal habitat 100, additional modules may be joined laterally and vertically to form an animal habitat such as the one shown in FIG. 15. Additional accessories such as additional openings and grates 108, 116, module connectors 160, 168, shelves 180, equipment 204, trays 178 and staircases 182, 184 may be added to the multiple-module habitat 100a. An animal placed inside the habitat 100a is free to roam between modules both laterally and vertically.

From the above description, it will be apparent that the invention disclosed herein provides a novel and advantageous animal habitat. The foregoing discussion discloses and describes merely exemplary methods and embodiments of the present invention. As will be understood by those familiar with the art, the invention may be embodied in other specific forms and utilize other materials without departing from the spirit or essential characteristics thereof. Accordingly, the disclosure of the present invention is intended to be illustrative, but not limiting, of the scope of the invention, which is set forth in the following claims.

What is claimed is:

1. An animal habitat, comprising:
a first and second module, each module including a first module section and a second module section joined to said first module section to define a cavity therebetween, each said module sections including a partial opening; means for joining both said first and second module sections; wherein each of said joined first and second module sections includes four walls emanating from a planar surface and at least one opening in one of said walls for entrance into and exit out of the habitat a door grate being fittingly engaged between said joined first and second module sections at aligned partial openings in one said wall; and a module connector fittingly engaged between said first module section of said first module and said first module section of said second module at aligned partial openings, and said module connector further fittingly engaged between said second module section of said first module and said second module section of said second module at aligned partial openings.

2. The animal habitat of claim 1, wherein each of the first and second module sections is of a continuous mold.

3. The animal habitat of claim 1, wherein the door grate includes a plurality of horizontal and vertical tubes, a door slidingly engaged within said plurality of vertical tubes allowing the door to be retracted to form an opening in the door grate and extended to close the door gate opening.

4. The animal habitat of claim 1, wherein the door grate includes a plurality of horizontal tubes spaced between two vertical tubes, a removable section having slotted vertical end portions, and a plurality of pins on two vertical tubes for securing the removable section to the door grate between said vertical tubes at said slotted end portions.

5. The animal habitat of claim 1, wherein a grate is fittingly engaged between said joined first and second module sections at aligned partial openings in said another wall.

6. The animal habitat of claim 5, wherein at least one shelf is engaged to and extends laterally from one of the plurality of horizontal tubes of the grate.

7. The animal habitat of claim 1, wherein the means for engaging and joining both the first and second module sections comprises a banding member fitted about and fastened to said walls at both the first and second module sections.

8. An animal habitat as claimed in claim 1, wherein each of said first and second module sections has a plurality of indentations in its said surface.

9. An animal habitat as claimed in claim 8, wherein said indentations of one said module section align with said indentations of another module section so that a beam may be inserted into a cavity formed between said aligned indentations.

10. An animal habitat as claimed in claim 9, wherein mechanical fasteners are driven through said module sections and into said beams to fasten said beams into said cavities and thereby join said modules.

11. An animal habitat, comprising:
first and second module sections of a first module joined together to define a cavity therebetween;
first and second module sections of a second module joined together to define a cavity therebetween;
means for joining both the first and second module sections of the first module and the first and second module sections of the second module;
wherein each of the first and second module sections of both the first and second modules includes four walls emanating from a planar surface and at least one opening in one of said walls for entrance into and exit out of the habitat; wherein each of the first and second module sections has a plurality of indentations on the said surfaces; and wherein the plurality of indentations of a first module section of a first said module opposingly align with the plurality of indentations of the second module section of a second said module to form a cavities there between, a beam in said cavities, and a plurality of fasteners are joining each beam to both the first module section of the first said module and the second module section of the second said module at said indentations to cause the first and second modules to become joined.

12. The animal habitat of claim 11, wherein the planar surface of a said first module section includes an opening.

13. The animal habitat of claim 12, wherein a staircase is placed in the first module below said opening in the planar surface in the first module section of the first module, and wherein the staircase includes one set of steps spaced at a regular interval and another set of steps of a lesser width than the first set of steps spaced at a regular interval directly between the first set of steps.

14. The animal habitat of claim 11, wherein a removable tray is fitted between one of the plurality of indentations and a wall of the second module section.

\* \* \* \* \*